US008380716B2

(12) United States Patent
Mirus

(10) Patent No.: US 8,380,716 B2
(45) Date of Patent: Feb. 19, 2013

(54) MIND MAP WITH DATA FEED LINKAGE AND SOCIAL NETWORK INTERACTION

(76) Inventor: Jan Mirus, München (DE)

( * ) Notice: Subject to any disclaimer, the term of this patent is extended or adjusted under 35 U.S.C. 154(b) by 231 days.

(21) Appl. No.: 12/779,140

(22) Filed: May 13, 2010

(65) Prior Publication Data
US 2011/0282873 A1 Nov. 17, 2011

(51) Int. Cl.
*G06F 7/00* (2006.01)
*G06F 17/30* (2006.01)
(52) U.S. Cl. .................................. 707/737; 707/755
(58) Field of Classification Search .................. None
See application file for complete search history.

(56) References Cited

U.S. PATENT DOCUMENTS

| | | | |
|---|---|---|---|
| 6,031,537 A | 2/2000 | Hugh | |
| 6,801,229 B1 | 10/2004 | Tinkler | |
| 6,918,096 B2 | 7/2005 | Hugh | |
| 7,249,123 B2 | 7/2007 | Elder | |
| 7,373,389 B2 | 5/2008 | Rosenbaum | |
| 7,433,876 B2 | 10/2008 | Spivack | |
| 7,536,637 B1 | 5/2009 | Nauerz | |
| 7,548,848 B1* | 6/2009 | Deb et al. ........................ | 704/9 |
| 2002/0174218 A1* | 11/2002 | Dick et al. ..................... | 709/224 |
| 2007/0171716 A1 | 7/2007 | Wright | |
| 2010/0010987 A1* | 1/2010 | Smyth et al. .................... | 707/5 |

OTHER PUBLICATIONS

Building Wordnets, Piek Vossen, Feb. 6, 2007, http://web.archive.org/web/20070206020840/http://www.globalwordnet.org/gwa/BuildingWordnets.ppt.*
Jaap Kamps, 2002, Visualizing wordnet structure, In Proc. of the 1st International Conference on Global WordNet, p. 182-186.*

* cited by examiner

*Primary Examiner* — Jay Morrison
(74) *Attorney, Agent, or Firm* — Michael J. Fegiin, Esq.; Feigin & Associates, LLC

(57) ABSTRACT

Embodiments of the disclosed technology comprise a method of augmenting a mind map of a plurality of objects based on at least one data feed. The method comprises providing an interface which contains visual representations of objects and associates semantic data with these objects. The interface allows for a user to access data from a data feed, and it analyzes these data in order to identify additional objects which may be semantically related to the object. A visual representation of the additional object is then augmented with a connector to the original object. Information about the relationships of the objects may be certified automatically or manually.

16 Claims, 14 Drawing Sheets

MIND MAP WITH DATA FEED LINKAGE AND SOCIAL NETWORK INTERACTION

FIELD OF THE DISCLOSED TECHNOLOGY

The disclosed technology relates generally to mind maps. More specifically, the disclosed technology relates to semantic communications between mind maps and third party data sources and networks.

BACKGROUND OF THE DISCLOSED TECHNOLOGY

Social networking and other networked tools have become an increasingly important part of professional and personal lives. As online tools have grown in popularity, these tools have allowed web users to generate access and link more and richer data sources. With this growth, these tools have grown in their potential to provide insight into relationships between humans and concepts. A problem that is presented by these increasingly rich webs of information is their complexity.

Among the traditional tools utilized in organizing access to information networks are search engines. Common electronic information "search engines" and search technology providers include: AOL, Northern Light, Yahoo, Google, AlltheWeb, Infoseek, Teoma, AltaVista, AskJeeves, HotBot, Inktomi, LookSmart, Lycos, FAST, Overture, About.com, Roadrunner, various Microsoft search engines, FindWhat.com, E-spotting, Search.com, and A9.com. Typically, these search engines provide textual, "key word," word and/or text based searching as human interface options for access to associated electronic information. Incorporation of "Boolean" connector (such as "and," "or," "not," etc.) functionality and/or "wild characters" (such as * or $) have proven beneficial. It is common for web browsers such as Mozilla Firefox, Google Chrome, Apple Safari, and so forth to incorporate an interface, or, interfaces, to one or more of these search engines.

As the numbers and types of information in searchable networks have expanded, they have become increasingly difficult for the web users who have created them to understand. This problem has become exacerbated through the explosion of online information associated with Web 2.0 technologies. Web 2.0 is a catch-all term for a group of technologies which include web applications that facilitate interactive information sharing, interoperability, user-centered design and collaboration on the Internet. Examples of Web 2.0 include web-based communities, hosted services, web applications, social-networking sites, video-sharing sites, wikis, and blogs. A Web 2.0 site allows its users to interact with other users or to change website content, in contrast to non-interactive websites where users are limited to the passive viewing of information that is provided to them.

Individuals, community members, employees, shareholders and customers are all impacted by the development of these complex online networks. Locating, accessing and utilizing all of this electronic information sometimes presents a daunting task. This is especially true with regard to non-structured electronic information that is arranged in the ad hoc webs generated as web user's link to each other's information. Unlike the almost universally utilized Dewey decimal system for locating items in physical libraries, a diverse array of "standards" has been introduced for accessing electronic information.

These networks can be built by web users interacting with digital networks that transmit and receive many different media and messages. When uploaded, these media and messages can become linked with the web user's online profiles and interests. As different web users link to other's profiles and data, rich networks are created. Typically, the information in these networks is simply listed in chronological order. Trying to follow a page of updates by hundreds of "friends" results in a disorganized and never-ending list of content with no real structure in which to make sense of all the data. Still further, organizing and distilling this information is a difficult and unsolved task in the art.

Accordingly, there exists the need for an improved electronic information organization and access system that facilitates quick and efficient information gathering and understanding for networks of data created by concepts, pages and data sources over the Internet.

SUMMARY OF THE DISCLOSED TECHNOLOGY

The disclosed technology described herein addresses a need unfulfilled in the prior art by providing an electronic information visualization and access method that facilitates quick and efficient visualization of networks created by concepts, pages and data sources over the Internet.

Accordingly, it is an object of the disclosed technology to provide an improved electronic visualization and access method which will encourage visualization and analysis of the complex relationships created by Web 2.0 tools such as online encyclopedias, online question and answer services (e.g. "Yahoo Answers"), and social networking platforms (e.g. Facebook and LinkedIn).

It is also an object of the disclosed technology to provide an improved electronic visualization and access system which is automatically updatable or constantly or persistently updated (defined as at least as often as new data becomes available), in order to reflect changes made to the data sources which feed data to a visualization system of the disclosed technology.

It is a further object of the disclosed technology to provide an improved electronic visualization and access system which uses semantic data to verify data feed information and to develop visualizations of rich data types that include web pages and other sources that are constantly changing.

Therefore, provided herein is a method for mapping semantic data using an electronic information visualization and access method that facilitates quick and efficient visualization of networks created by concepts, pages and data sources over the Internet.

In an embodiment of the disclosed technology, a method of augmenting a mind map based on at least one data feed accessed via a network node follows the foregoing steps. First, a visual representation of an object is generated and exhibited. An "object," as used in this disclosure, refers to a concept, idea, goal, person, location, or (data) file. Next, semantic data are associated with the object. A control is then provided that is operable to access data from a data feed via a network node (defined as a point on a electronic network). The data feed is one in which is provided, generally by a third party, over a network cloud and comprising, in some embodiments, an updating stream of data. This stream of data is appendable by a user of the disclosed technology or by a plethora of third parties. Examples include a social networking profile with comments and the like, or an article with links to others. A "control," as used in this disclosure, refers to a component of the interface which allows a user to initiate some action manually, typically by the click of a mouse button or keystroke. An output of the data feed is then analyzed, in order to identify additional objects which may be semantically related to the original object. The visual representation of the original object is then augmented with a connector which connects the original object and the additional object.

In an embodiment of a method of the disclosed technology, the step of identifying additional objects may also prompt a user with a related object imported from another mind map. The source of that related object may be signified by visual indicia which accompanies the visual representation of the related object.

In one embodiment of a method of the disclosed technology, an additional step of certifying (also known as "disambiguating") the semantic data which corresponds to the object. The certification may be carried out automatically, using a data source, or manually by a user. In another embodiment, the certification step may be performed by using an object found in another mind map as a data source for certifying the semantic data. Some visual indicia may be included with the visual representation of the object in order to signify whether the corresponding semantic data has been certified and which certification data source was use. The certification data source may include, but is not limited to, a hypertext markup language (HTML) document, a global navigation satellite system receiver, or a storage medium.

In another embodiment, a similar icon may be used to signify the type of association one object forms with another. In other words, it may contain information which classifies the type of interrelation between the two objects that are linked. A further embodiment of a method of the disclosed technology automatically assigns a type of association to the connector using semantic data. An alternative embodiment allows a type of association to be assigned manually by a user.

In yet another embodiment of a method of the disclosed technology, an additional step of arranging the plurality of objects in a hierarchical fashion based on the interdependency of the original object with at least one additional object. This embodiment may further comprise the step of centralizing an object which possesses a greater number of connectors. Thus creating a hierarchical or graph/rhizome structure where the object with the most associated objects is centered, or the connectors are emboldened based on the number of connections.

In yet a further embodiment of a method of the disclosed technology, an additional step of adding semantic information corresponding to the object by way of classifying the object as a member of a class is disclosed. The class also has semantic information associated with it. In one embodiment of the disclosed technology, the class contains or comprises data associated with individual people that is imported from a social networking platform. In an alternative embodiment of the disclosed technology, the class contains or comprises information regarding geographic locations.

In another embodiment of a method of the disclosed technology, the connector contains information indicative of the type of association of which it is representative.

In yet another embodiment, the data feed comprises or contains information associated with a person imported from a third party social networking platform. In this embodiment, a method of the disclosed technology involves one or a plurality of the following additional steps. The social networking platform data may be used to update a visual representation of interconnected or semantically linked data by importing new data as it becomes available from the third party social networking platform. Then, the new data are automatically mapped to the interface by creating a new object with a corresponding new visual representation thereof. New semantic data and a new visual representation will then be associated with the new object. Furthermore, a new connector will be provided to link the new object with a pre-existing object.

Another method of providing a visual representation of a plurality of objects follows the foregoing steps. First, an interface is provided that is operable to generate a visual representation of a first thoughtbubble. A "thoughtbubble," as used in this disclosure, is a visual representation of an object or concept which contains semantic data associated with the object. The thoughtbubble may be representative of a concept, idea, goal, person, location, or file. This first thoughtbubble has semantic data associated with it. Next, a visual representation of a second thoughtbubble is generated. The second thoughtbubble also has semantic data associated with it. Subsequently, an interface is provided that is operable to generate a connector between the first thoughtbubble and the second thoughtbubble. A connector is then generated and contains associated semantic data as well. Next, the semantic data associated with one or both of the thoughtbubbles is updated to reflect the semantic data associated with the connector. Now, the semantic data associated with the first thoughtbubble is updated based on the semantic data associated with the second thoughtbubble. An operable means for accessing data from a data feed is then provided. The data feed produces a result which is then analyzed for information that is semantically related to each of the thoughtbubbles. Finally, a visual representation is augmented for each of the thoughtbubbles. It contains or comprises a visual indicator which is representative of the interdependency of the thoughtbubbles with respect to each other.

Still further, in accordance with any of the embodiments described above, by way of interacting with said visual representation of an object, a response to data received from a social networking platform data feed, or new data to be injected into a social networking platform, may be created through the visual representation provided in embodiments of the disclosed technology. That is, a thoughtbubble or visualization may be interacted with to instruct a social networking platform to augment the data feed or data on the social network with data provided during the interaction with the thoughtbubble or visualization.

In accordance with these and other objects which will become apparent hereinafter, the disclosed technology will now be described with particular reference to the drawings.

DETAILED DESCRIPTION OF EMBODIMENTS OF THE DISCLOSED TECHNOLOGY

Embodiments of the disclosed technology provide a method of augmenting a mind map of a plurality of objects based on at least one data feed. The method comprises or consists of providing an interface which contains visual representations of objects and associates semantic data with these objects. The interface allows for a user to access data from a data feed, and it analyzes these data in order to identify additional objects which may be semantically related to the object. A visual representation of the additional object is then augmented with a connector to the original object. Information about the relationships of the objects may be corroborated automatically or manually With reference now to the drawings, a method is shown for augmenting a mind map based on at least one data feed using an interface and associated semantic data.

Figure 1:
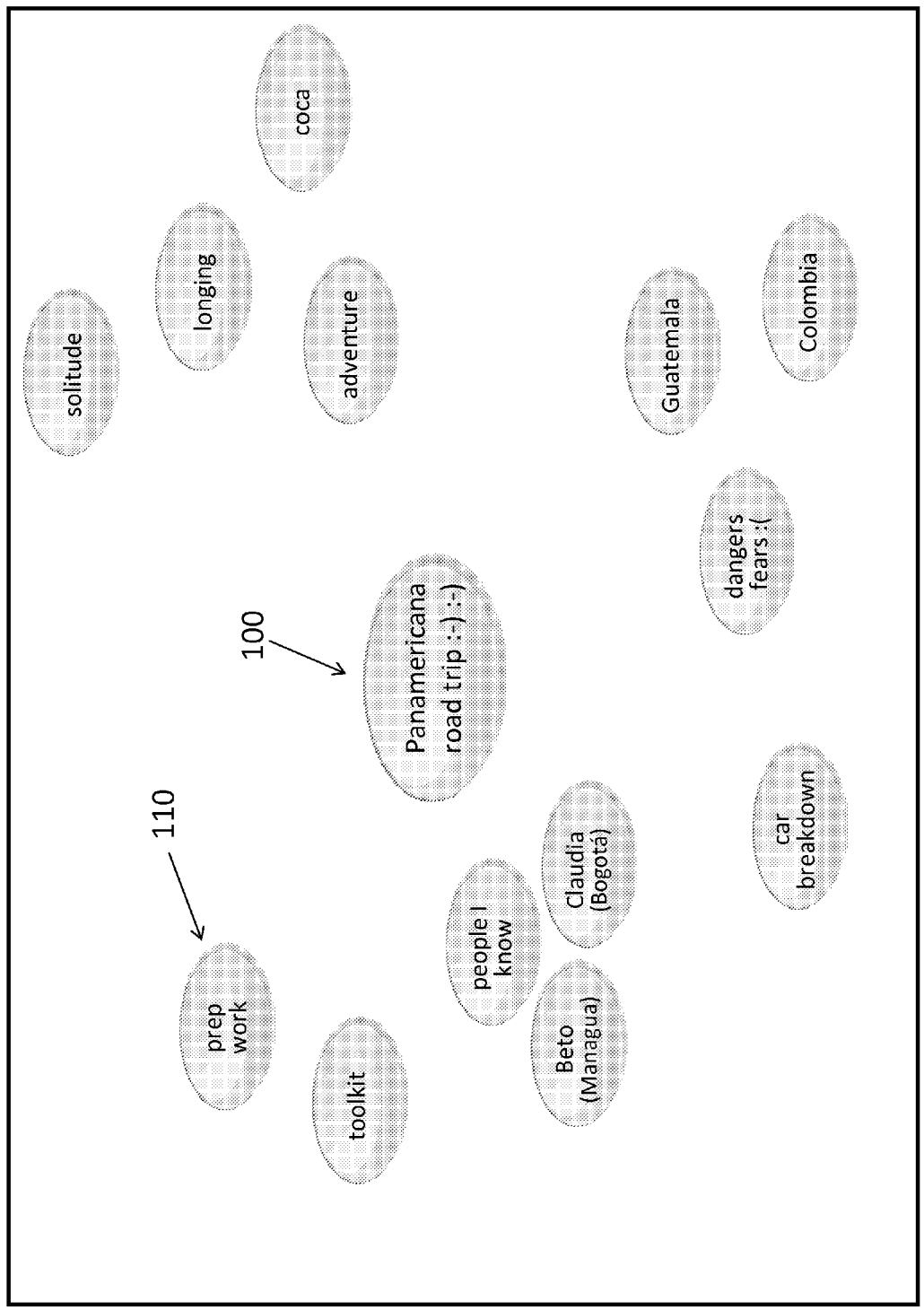
FIG. 1 is an example of a mind map visualization representation of an interface of a method of the disclosed technology.
Figure 12:
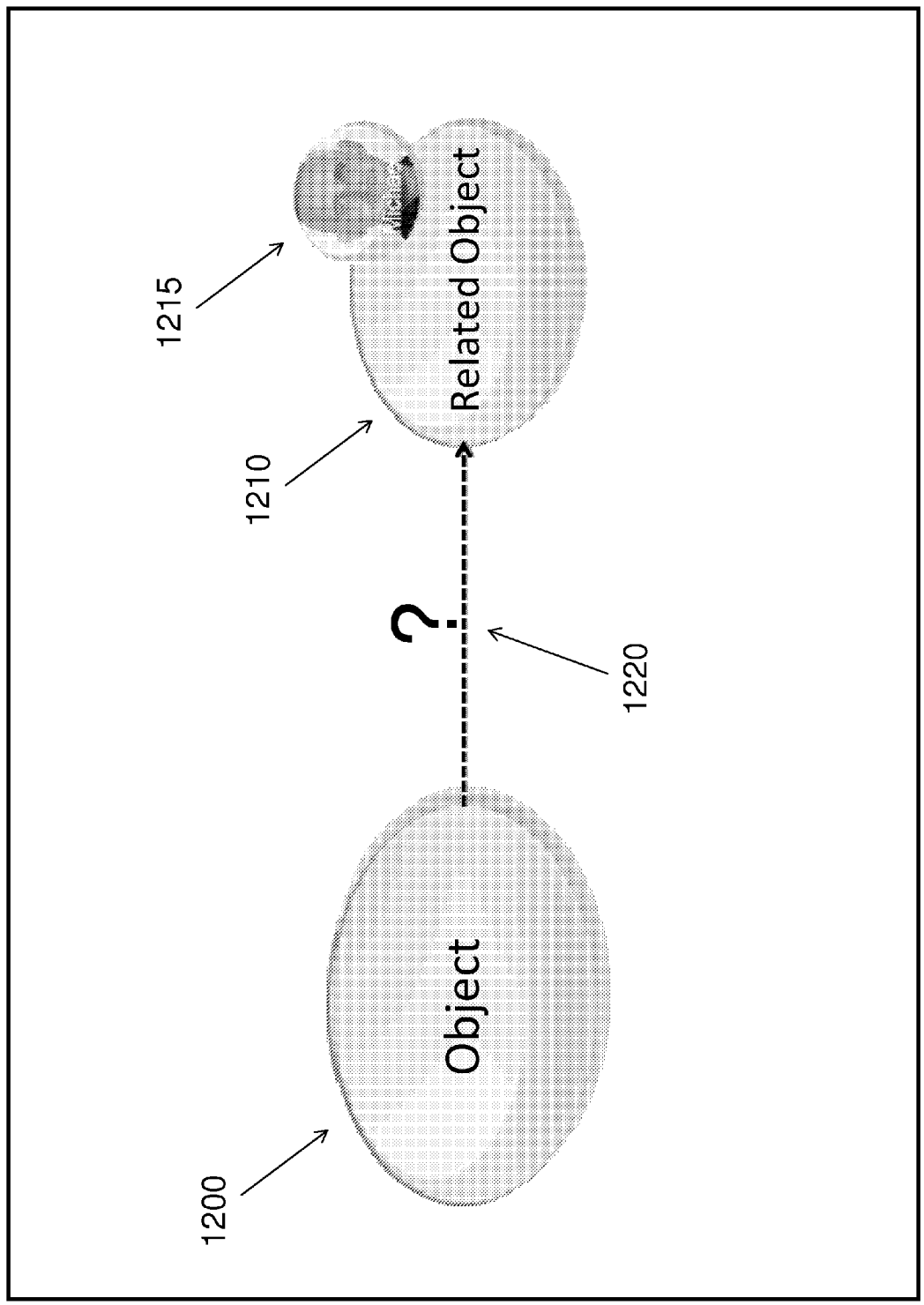
FIG. 12 shows an alternative embodiment of a method of the disclosed technology in which a related object is proposed to a user from another user's mind map.

FIG. 1 is an example of a mind map visualization representation of an interface of a method of the disclosed technology. A "mind map" is a tool that allows users to create visual representations of relationships between simple data structures, such as files, objects, concepts, or text segments. A mind map is a diagram used to represent words, ideas, tasks, or other items linked to and arranged around a central key word or idea. The elements of a given mind map are arranged intuitively according to the importance of the concepts, and are classified into groupings, branches, or areas, with the goal of representing semantic or other connections between portions of information. The method begins with the identification of an object. An "object," as used in this disclosure, refers to a concept, idea, goal, person, location, or file. A visual representation 100 of the object is generated and exhibited within an interface. The interface may be any electronic information visualization or display including on a computer monitor, LCD screen, series of hard copy printouts in ink, and the like. The interface may further have input/output capabilities, such as by using a keyboard, mouse, or the like. FIG. 12 shows a high level interface and is described in further detail below.

In the example shown in FIG. 1, the visual representation 100 is representative of the object "Panamericana road trip." In this particular example, the object is an idea, or could possibly also be referred to as a concept or goal. Referring back to FIG. 1, additional visual representations 110 of objects are also generated and exhibited. Element number 110 points to the visual representation "prep work," but in this specification element, number 110 collectively refers to all of the additional representations (i.e., "adventure," "people I know," etc. . . . ). In this example, these objects are in some way associated with the original object, "Panamericana road trip." However, this does not necessarily have to be the case. Any concept, idea, goal, person, location, or file may be the basis of a visual representation of an object. As will become apparent with reference to the subsequent figures, the less important objects will eventually become more de-centralized with regard to the other objects.

Referring still to FIG. 1, each of the objects will have semantic content data associated with them. "Semantic content," as used in this disclosure, generally refers to data or a concept associated with an object which describes a characteristic or feature of the object itself. Semantic data can be textual content representative of an idea, a goal, an association with another object, a source of information, or textual description of an object. Semantic data may also be an image, audio, video, document, feed, or any other file type which may be stored on a local or remote drive. Semantic data in the form of a source of information may be a rich text field or concept, such as data from Wikipedia, online mapping tools, online social networks (e.g. Facebook), or any other web-based information resource or web-link thereof.

Semantic content data, in embodiments of the disclosed technology, is assigned to an object by a user via the interface, or programmatically through a data feed or some other data source. A "data feed" involves the transfer of data from one or more data sources via a network node and a communication channel. A data feed may be an RSS data feed ("Really Simple Syndication", as is known in the art), a data feed on a social network associated with a person, group (e.g. people who are fans of eggs with multiple yolks or in the tautology club), or application (e.g. a "Farmville" or other game). A data feed may include, a database, the contents of a hard drive, a web page with dynamic content, a web service, a satellite information service such a global positioning system ("GPS"), a wireless data source, or any other source. Some examples of a web-based data feed may include a feed of Wikipedia articles or updates thereto, social networking platforms (e.g. Facebook or LinkedIn) and messages to a user or responses to a comment, link or the like, online maps (e.g. Google Maps or other geographic location data associated with a class or object) and so forth.

Such data feeds may be associated automatically or manually with an object represented in the mind map. For example, referring still to FIG. 1, the visual representation of the object entitled "Guatemala" may programmatically associate encyclopedic data from a data source such as an online encyclopedic reference (e.g. Wikipedia, available at the time of this writing), whereby an encyclopedia entry regarding the country of Guatemala will be automatically linked to the visual representation of the object. The launching of a document, such as a HyperText Markup Language ("HTML") document in the form of an encyclopedia entry is done by way of a user-initiated "control" which will be explained further in the detailed description with reference to FIG. 6. In the instance in which an object refers to a person, a third party social networking platform may comprise one or more of the data feeds and data sources associated with that object. For example, referring still to FIG. 1, the visual representation entitled "Claudia" may programmatically assign semantic data associated with a person named "Claudia" from a third party social networking platform (e.g. a "friend" or $1^{st}$ degree connection on a social networking platform. The type of data imported and assigned to the object may include an image of Claudia contained in a social networking profile, or other online profile for Claudia, a text document containing Claudia's resume, and/or text containing her contact information, background, interests, etc. The type of semantic data to be imported depends on a user's preferences and is configured by the user. For instance, an employment/occupational mind map may only include work-related and contact information for a given person or be filtered in another manner, as desired.

The semantic content data associated with various objects is, in embodiments of the disclosed technology, continuously or persistently (as available or at regular time intervals, such as 15 or 30 seconds) updated, so long as the data sources and data feeds are accessible. In this way, the mind web is always up-to-date and contains real-time data. For example, a person may change a hypertext markup language document associated with him/her on his/her social networking profile to reflect changes to his/her occupational status. If this profile is a data feed assigned to an object representative of that person in a mind web, the changed information will sync to the object automatically in the visualization thereof.

Figure 2:
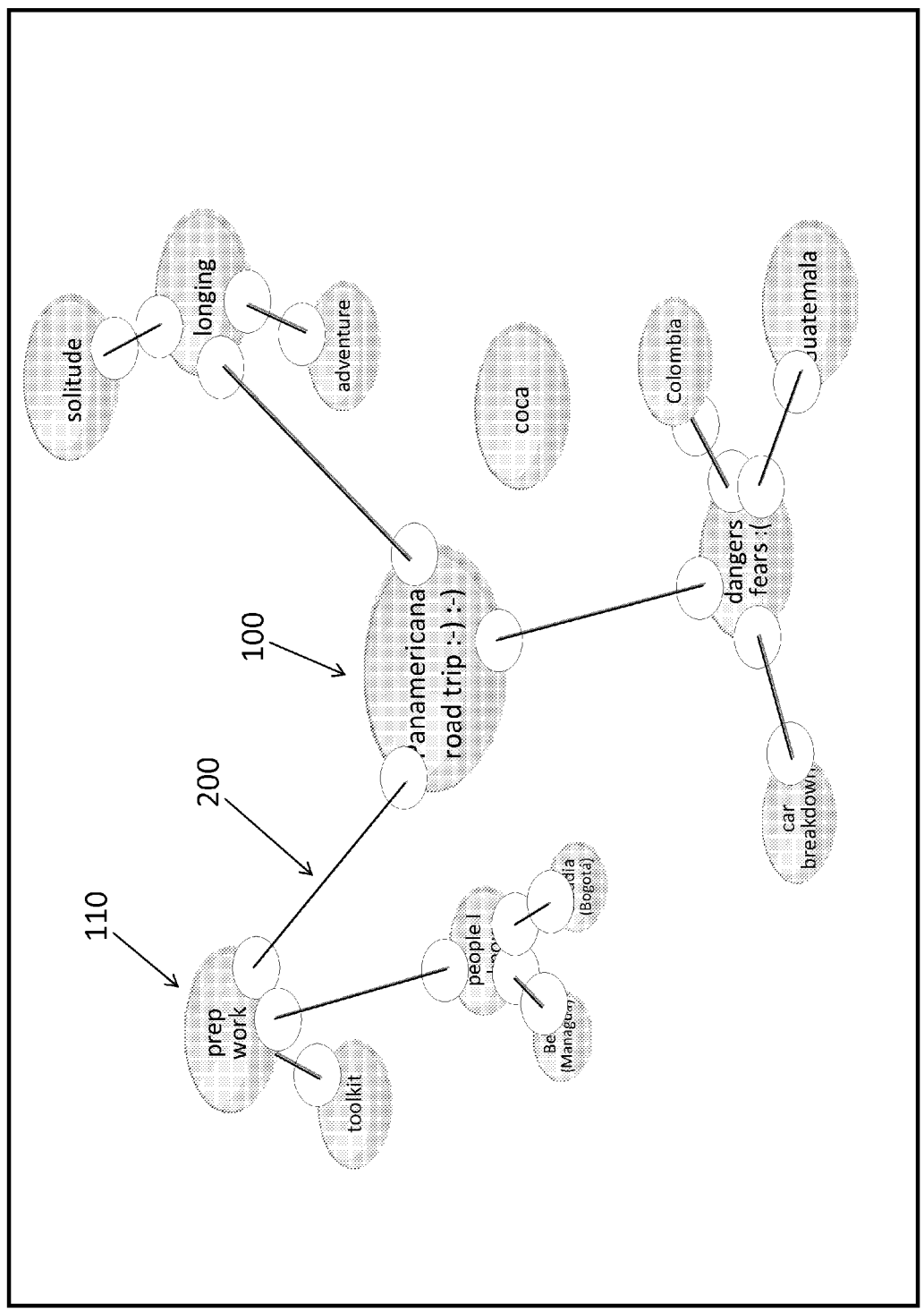
FIG. 2 shows the mind map visualization representation of FIG. 1 with the addition of connectors.

With reference now to FIG. 2, connectors 200 or links between the various visual representations of objects are shown. The visual representations 100 and 110 of objects can have associated connectors 200 that link them to other objects, data feeds or data sources. When visual representations 100 and 110 of objects are displayed, their associated connectors 200 can also be displayed in order to represent a set of linked items as a web. The connectors 200 are augmented manually by the user or may be augmented automatically, using semantic data associated with each of the objects.

The connectors 200 likewise may contain associated semantic data themselves. Connectors 200 can have associated weights that indicate the strength of the connection between two or more items. For example, a connector's weight or importance may be represented by a thicker line, a line of a certain color, or a line of a certain style (i.e., dotted). Moreover, a connector can also possess a visual trait which is indicative of the nature of interrelation between objects of which it is representative. Examples of the types of associations may include "is the cause for," "follows after," "influences," "helps with," and "is alternative to."

Another feature of the objects and connectors of the method of the disclosed technology is the ability of the interface to certify user-entered semantic data using one or more data sources. An object which possesses associated certified content is disambiguated by determining which third party content should be related, and how it is related. The data sources which certify semantic data are comparable to those which are used as automatic data feeds, i.e., from an online encyclopedia or reference site, social network, etc. An example of certification of data could be the instance in which a user manually enters contact information about an individual into a visual representation of an object representing that individual. The interface may be configured to certify such information, using a third party social networking database. Upon certifying the contact information on the individual's social networking profile, the visual representation of the object may contain an icon containing, for example, Facebook.com's trademarked white "F" within a blue square. Such an icon indicates to a user that information contained within a given object has been certified using Facebook.com as a data source. Other examples include certifying locations using an online map as a data source. Still further, once this is accomplished, related data may be added which is pulled down from the data source. That is, when adding and certifying "Guatemala" or any other object to a mind map and semantic data or another object included "rivers", then rivers within Guatemala, by way of example, may be added appropriately to the mind map and connected, as will be discussed further below.

Figure 3:
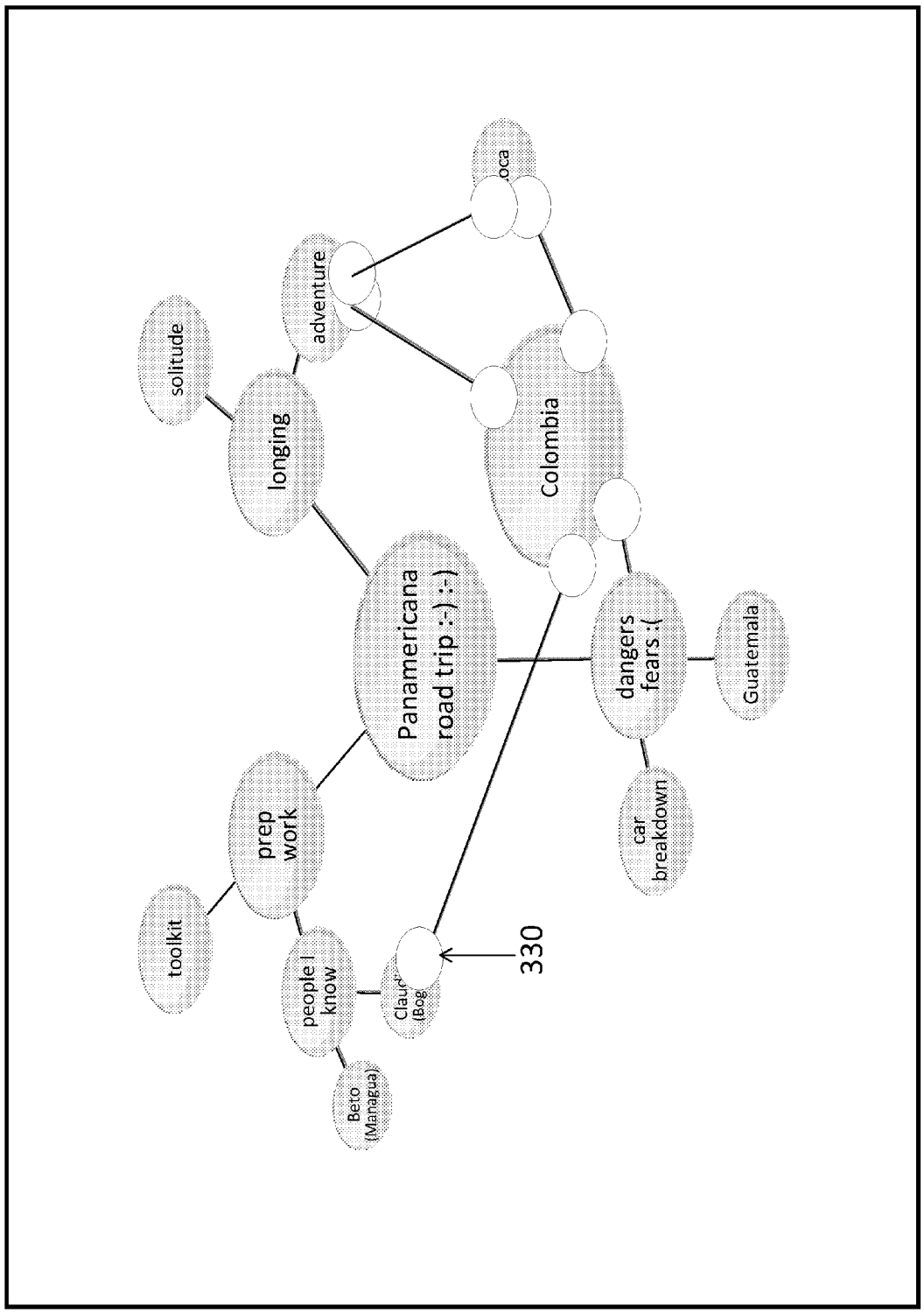
FIG. 3 shows the mind map visualization representation of FIG. 2 with certain objects becoming centralized, based on the number of connections.

FIG. 3 shows the mind map visualization representation of FIG. 2 with certain objects becoming centralized, based on the number of connections. Referring now to FIG. 3, the ability of the interface to automatically augment connections becomes apparent. A step of a method of the disclosed technology involves analyzing the output of a data feed and identifying additional objects which are semantically related to the original object. In FIG. 3, the visual representation of the object labeled "Claudia" may contain semantic information imported from a third party social networking database about an individual named "Claudia." This information may include geographic information pertaining to where "Claudia" resides. In this example, semantic data associated with the individual "Claudia" gathers that she has some connection to Bogota. Likewise, the visual representation of the object labeled "Colombia" may contain semantic information imported from a web-based encyclopedia. This semantic information is likely to include a list of all the major cities in Colombia. All of the data contained in the mind map is then analyzed, and it is identified that the objects labeled "Claudia" and "Colombia" are semantically related (namely that "Claudia" has some connection to Bogota, which is the capital city of the country of Colombia). Thereafter, a connector is automatically augmented between the visual representations of "Claudia" and "Colombia." In this instance, the connector may exhibit a characteristic which serves to indicate that the nature of interrelation is geographic.

The example shown in FIG. 3 also makes apparent another feature of an embodiment of the method of the disclosed technology. This feature is a step of the method in which the "link weight" of a certain object lends credence to the size and location of its respective visual representation. "Link weight," as used in this specification, refers to the number of connectors a given object possesses. In other words, an object with a greater number of connections to other objects has a greater link weight and thus becomes more centralized within the mind map interface. Referring back to the example shown in FIG. 3, the object labeled "Colombia" now possesses additional connections to those originally manually assigned by a user, as shown in FIG. 2. The new connections are represented by the highlighted joints 330 in FIG. 3. Because of the greater link weight of the object labeled "Colombia," the visual representation of the object has grown in size and has nucleated towards the center of the mind web as a whole. Conversely, those objects which possess a smaller number of connections become less centralized, moving towards the outskirts of the mind map.

Figure 4:
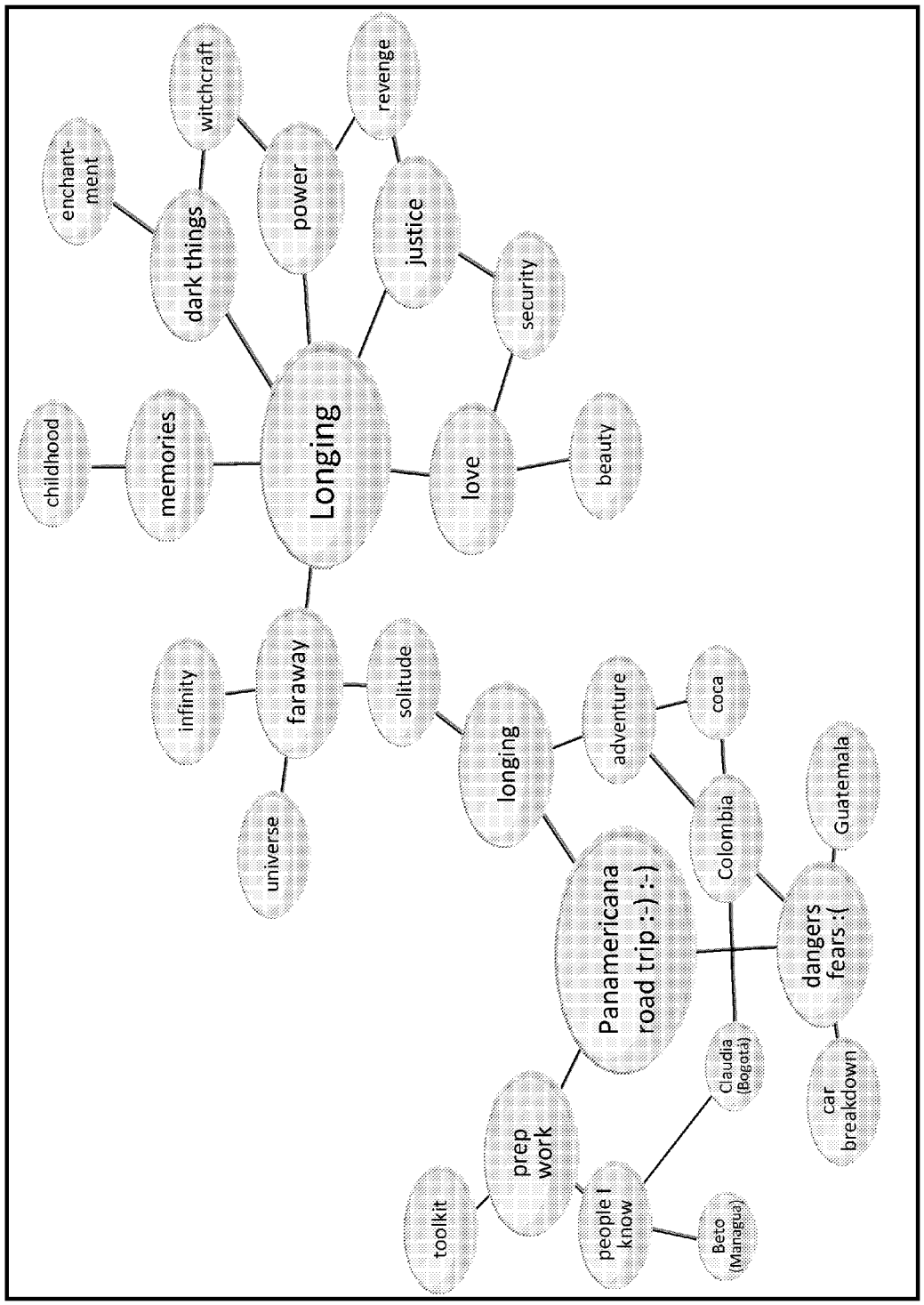
FIG. 4 shows the mind map visualization representation of FIG. 2 becoming merged with another mind map.

FIG. 4 shows the mind map visualization representation of FIG. 2 becoming merged with another mind map. Embodiments of the method of the disclosed technology may encompass multiple mind maps containing multiple nuclei. Mind maps which contain elements in common with other mind maps may overlap with one another. In the example exhibited in FIG. 4, the mind map of FIG. 2 is shown to have the object reflecting the idea of "longing" in common with an additional mind map centralized around an object also containing the idea of "longing."

Figure 5:
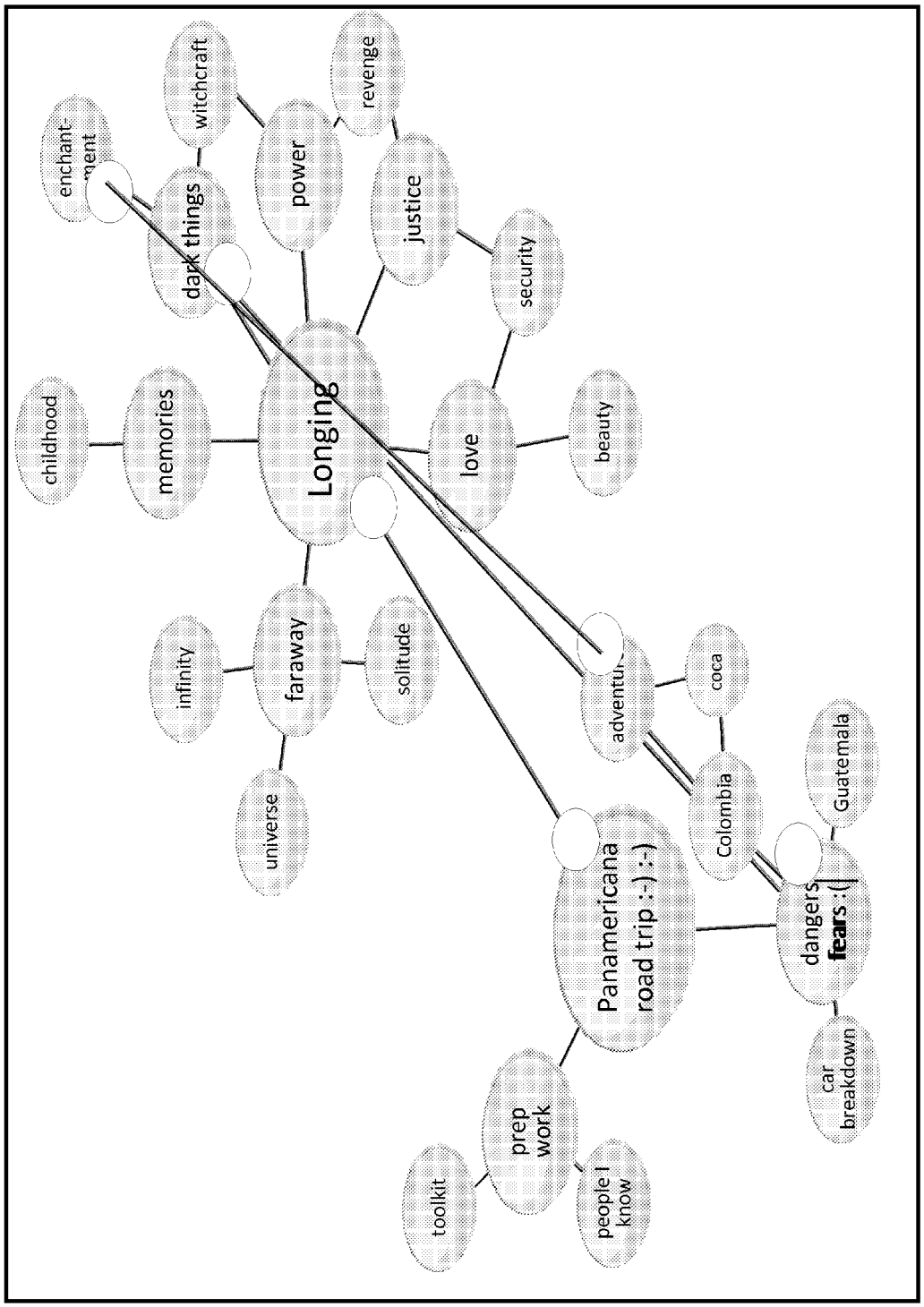
FIG. 5 shows an alternative embodiment of the mind map visualization representations of FIG. 4.

FIG. 5 shows an alternative embodiment of the mind map visualization representations of FIG. 4. In this example, the objects in common between the two distinct mind webs merge. The visual representation of the object reflecting the idea of "longing" becomes the centralized nucleus of another mind web. Thus a single mind web is formed in which the objects labeled "Panamericana road trip" and "Longing" become the most centralized themes.

Figure 6:
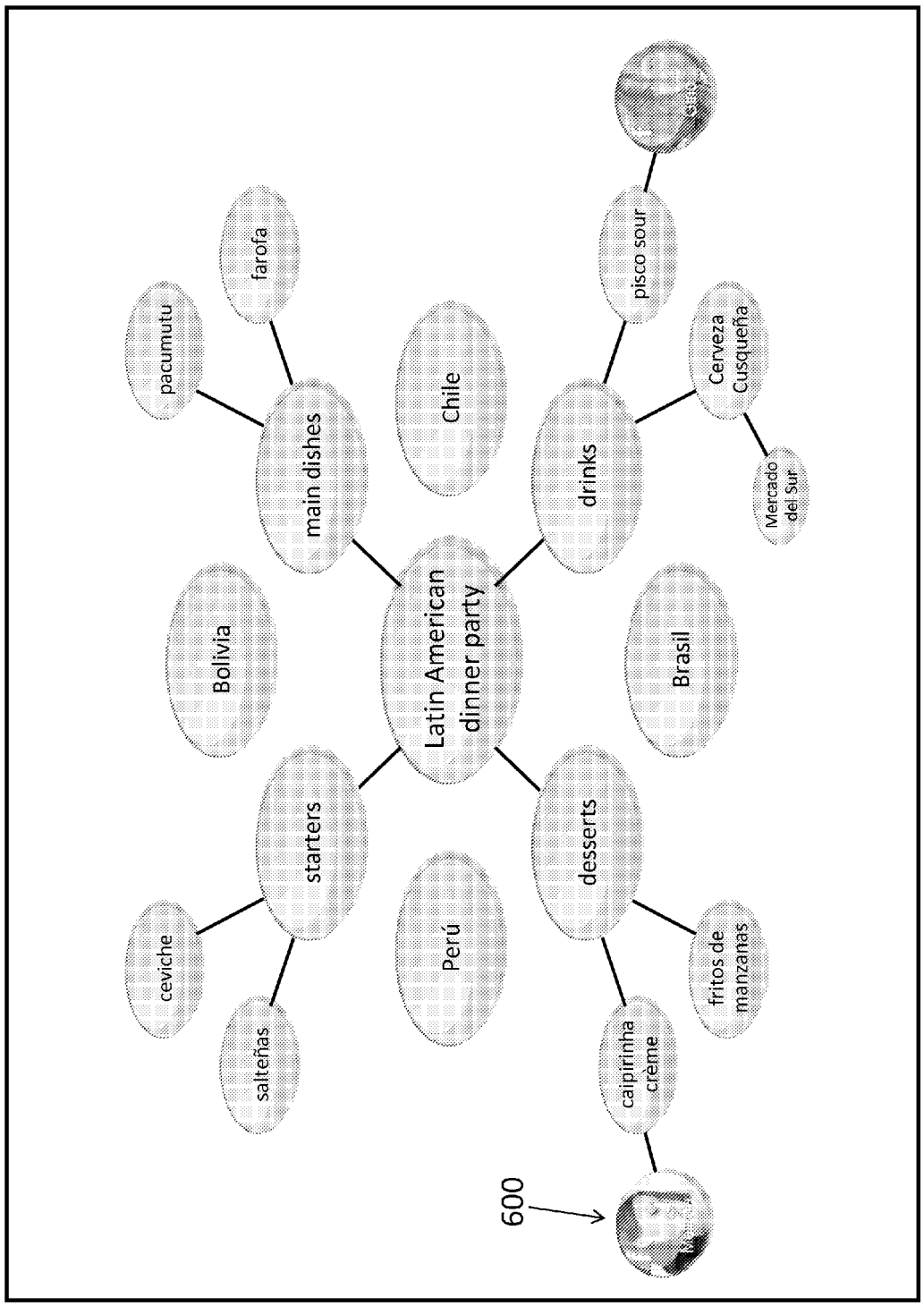
FIG. 6 is another example of a mind map visualization representation showing objects based on data associated with an individual which is imported from a third-party social networking platform.

FIG. 6 is another example of a mind map visualization representation showing objects based on data associated with an individual which is imported from a third-party social networking platform. This example is centralized around an object which references a "Latin American dinner party." In this example certain objects within the mind map form associations with data associated with an individual person. The visual representation of the object "caipirinha crème" is semantically related to data associated with a contact imported from the third party social networking platform. As shown, the object 600 associated with a contact "Melissa," an individual, is visually distinct from those objects which represent locations, ideas, concepts, foods, etc. The visual representation of the individual not only contains an image of the contact which it represents, it also contains an icon with a trademarked logo of the social network for which it connects. This connection may be generated in one of a few ways. It may be manually inputted by a user to connect to the "caipirinha crème" object, it may be inserted based on seeking out social networking data feeds and finding content on the social network (or other) feeds relevant to objects on the mind map, or "Melissa" (or others from social network or other feeds) may be linked to any food item, or an item within a class. This will be described in greater detail with reference to later figures.

In one embodiment of the disclosed technology, this icon may serve to indicate the source of that object, as a trademark indicates a source of goods. Alternatively, in another embodiment of the method of the disclosed technology, the logo may also serve to indicate the type of semantic data associated with the content, e.g. "Melissa" having been certified using Facebook as a data source has social networking content. In this particular example of a mind map according to a method of the disclosed technology, a user is using a mind map in order to plan a Latin American Dinner Party. The user lists the various courses, and corresponding foods and drinks associated with these courses. The interface is configured to then automatically analyze a data feed from a data source, which in this case is the third party social networking platform, Facebook. The data feed may be, for instance, relegated to a user's particular "friends" on Facebook, or a particular subset of those friends classified by comments, pictures, location, college, network, age, etc which is relevant to the party and thus, send invites to them via the social network, add their data feeds or a subset thereof (such as a conversation to them related to this event) to the mind map, or both.

A data feed associated with a third party social networking data source such as a social network is imported, in embodiments of the disclosed technology, using hypertext markup language (herein "HTML") or an extensible markup language (XML) extension thereof. An application programming interface (herein "API"), such as those provided by a social networking platform, is generally used to interact with the third party content and update content of the mind map (visualization) or the social network. In the particular case of Facebook, for example, Facebook Markup Language (herein "FBML") is used. An API entitled XFBML, known in the art, is used in order to allow other programs to interact and exchange information with the Facebook database. Referring back to FIG. 6, the interface of the disclosed technology uses the XFBML API in order to import and translate data to the mind map. Other data sources provide similar API's in order to allow compatibility with other software programs such as the interface of the disclosed technology.

Figure 7:
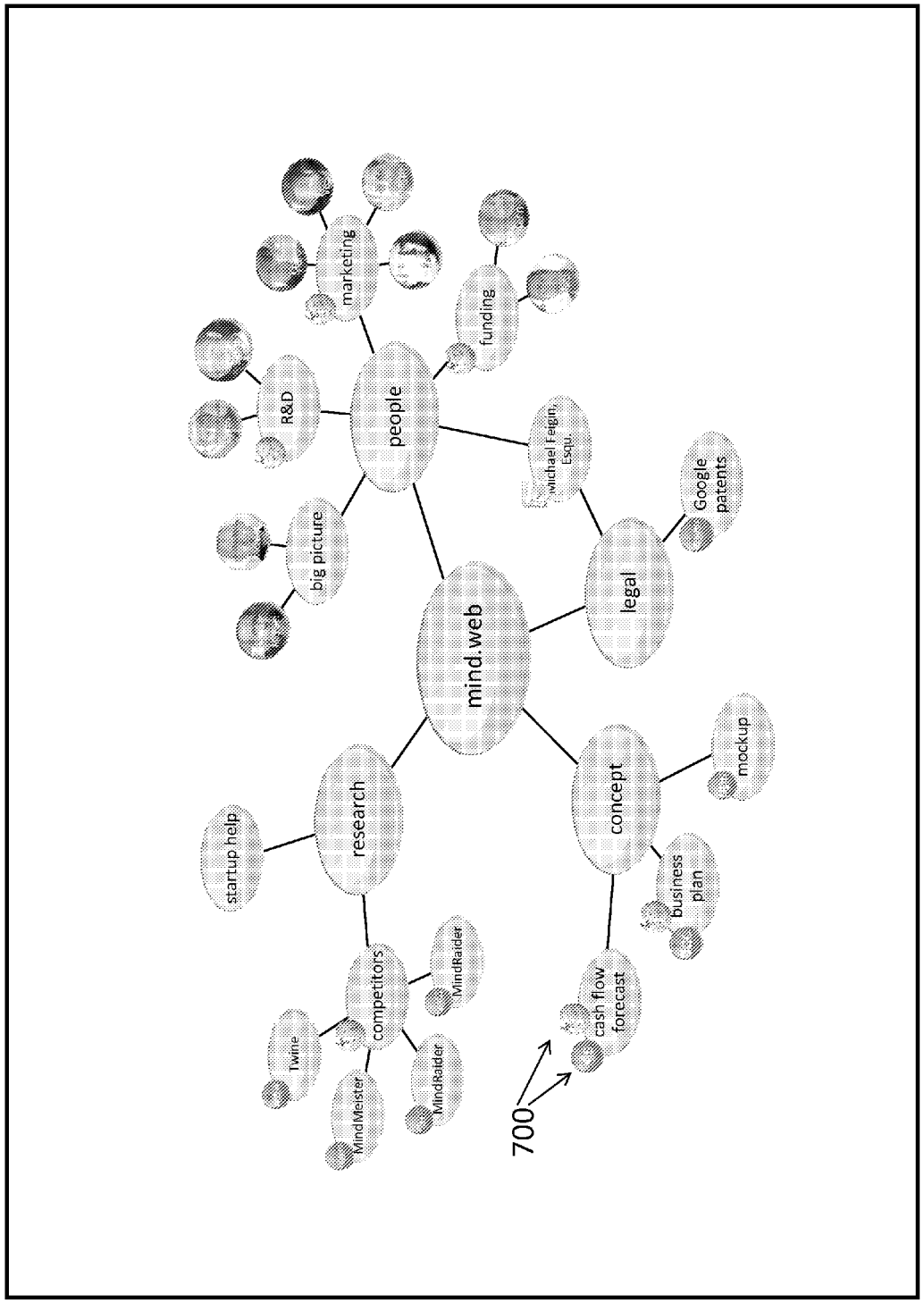
FIG. 7 is yet another example of a mind map visualization representation in which some objects include a visual representation identifying a classification of semantic content.

FIG. 7 is yet another example of a mind map visualization representation in which some objects include a visual representation identifying a classification of semantic content. As described to in the above paragraphs, different objects will possess different classes of semantic content. For instance, an object associated with an individual may contain semantic content in the form of text-based contact information and an image of the person, whereas an object associated with a geographic location may contain a map of the location and text-based content with an address or longitude/latitude coordinates.

Referring back to FIG. 7, the classification (also referred to as, "the class" or "classes" of semantic data refers to a type of object, i.e., website, document, contact information, type of source (e.g. "social network"), actual source (e.g. pictures from friends profile on a specific social network), accompanies the visual representation of various objects. For example, the visual representation of an object entitled "cash flow forecast" possesses two different classification icons 700. One icon 700 comprises a circle with the text "xls" written within. This indicates to a user that this object, amongst other data, contains associated semantic content in the form of a spreadsheet document and is in the class of spreadsheet documents. Another icon 700 contained in the visual representation of the object referring to "cash flow forecast" comprises a circle containing a "Wikipedia" logo. This serves to indicate that this particular object also possesses semantic data in the form of an encyclopedic entry associated with it, or other data which is defined in the class for which this object belongs. As discussed previously, such semantic data may be manually assigned by a user or synchronized automatically by the interface.

Other types of classifications of semantic content shown in FIG. 7 include PowerPoint Slideshow ("pps"), websites ("www"), text documents ("doc"), emails (and feeds thereof), graphic file ("png"), and data associated with individuals imported from social networking platforms. The types of classifications that may be used are essentially limitless, given the vast expanse of file types and data sources associated with the Internet and computers. Moreover, visual indicia of associated semantic content may take any form, such as, but not limited to, icons accompanying a visual representation, images which are representative of the corresponding class of semantic content, and different-sized shaped and colored visual representations. A class of data, or an object associated with classified data may comprise data indicative of geographic location (place) or time. In this manner, any added object can be linked semantically with a location on a map or a time in which it occurred. The time may be the current time, the time the object was added or the like. The place or geographic location may also be obtained by way of the use of a satellite navigation system receiver, such as a GPS (global positioning system) or satellite navigation system.

Figure 8:
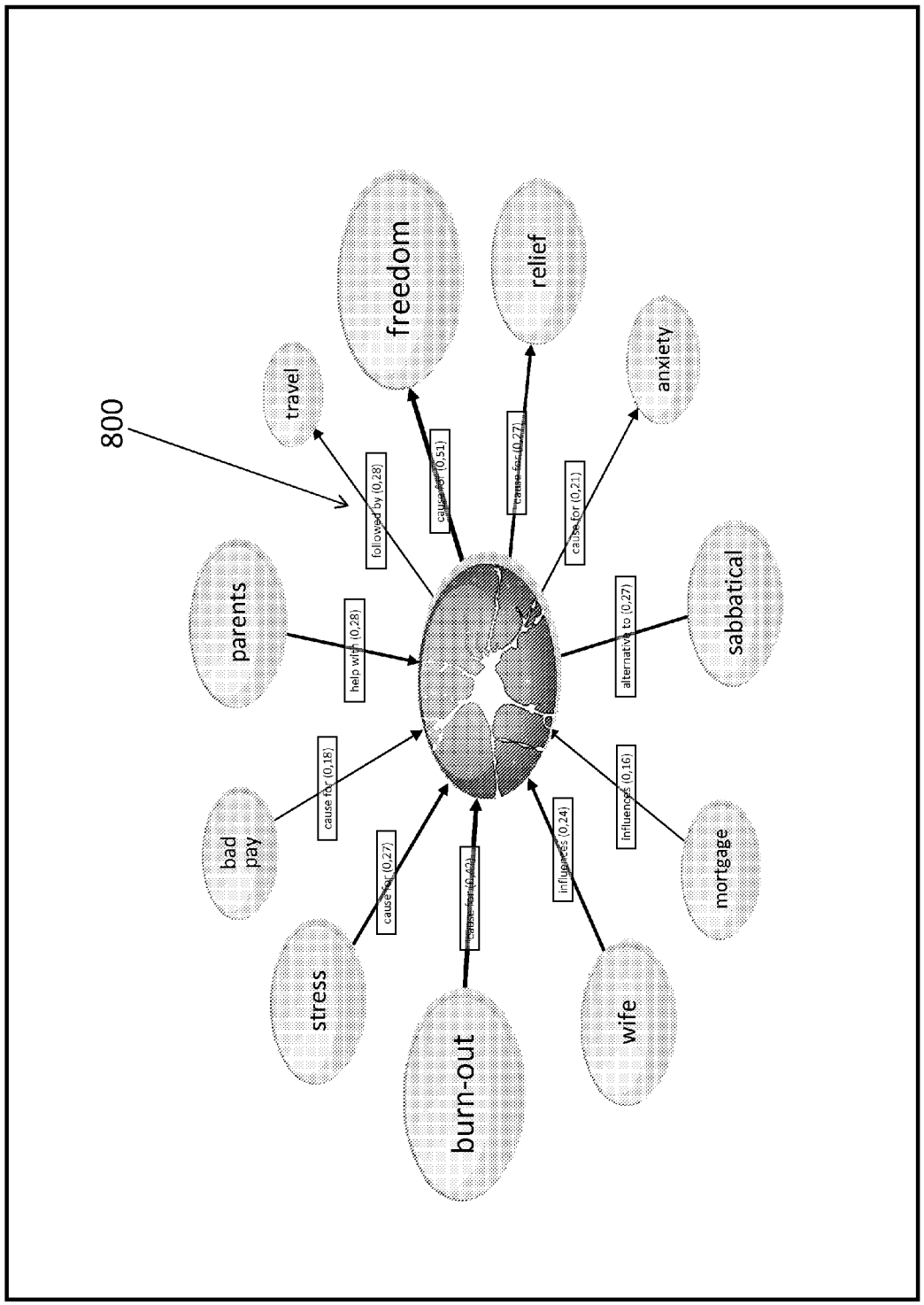
FIG. 8 is yet another example of a mind map visualization representation in which the connections include a visual representation identifying the type of association of which they are indicative.

FIG. 8 is yet another example of a mind map visualization representation in which the connections include a visual representation identifying the type of link of which they are indicative. As previously alluded to, the connectors 800, likewise may contain associated semantic data themselves. The connectors 800 may have associated weights that indicate the strength of the connection between two or more objects. For example, a connector's 800 weight or importance may be represented by a thicker line, a line of a certain color, or a line of a certain style (i.e., dotted). Moreover, a connector 800 can also possess a visual trait which is indicative of the nature of interrelation between those objects of which it is representative. Referring still to FIG. 8, the connectors 800 may also contain an actual text describing the nature of the connection, a number indicating the weight of the connection, and an arrow which indicates the direction of the association. Examples of the types of associations may include "is the cause for," "follows after," "influences," "helps with," and "is alternative to."

Figure 9:
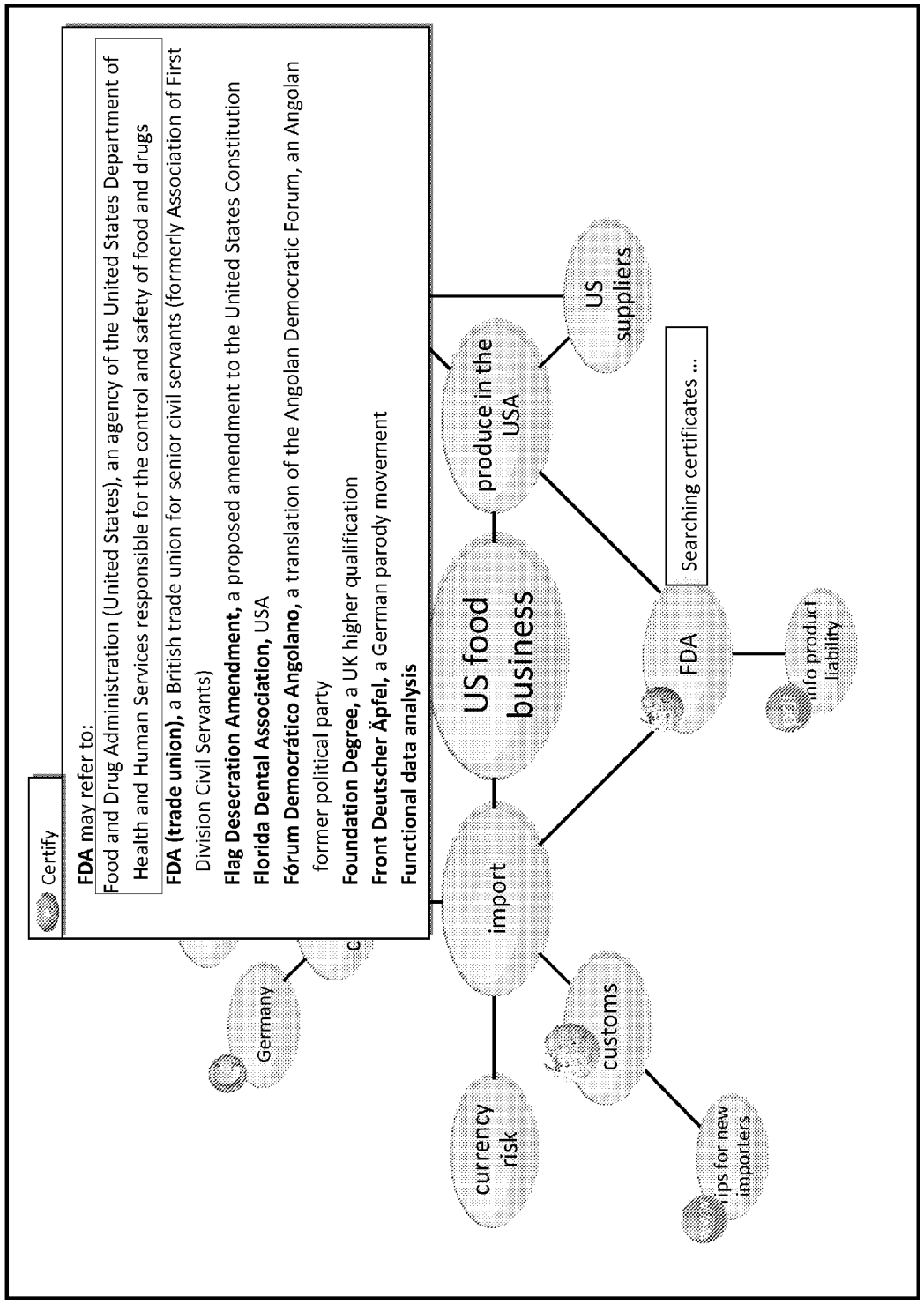
FIG. 9 shows an alternative embodiment of a method of the disclosed technology in which data is certified using an additional step of prompting a user.

FIG. 9 shows an alternative embodiment of a method of the disclosed technology in which data are certified using an additional step of prompting a user. The method may include an intermediary step of a certification of semantic data which involves a user's input to confirm the actual substance of a given visual representation of an object. In this example, a user has created a visual representation of an object labeled "FDA." Using a certification data source (in this case an editable encyclopedia), the interface prompts the user with a list of full names to which the acronym "FDA" may be referring. In this particular example, the user prompt is in the form of a pop-up window in the mind map interface. The user is then able to select the name which best describes his or her intended meaning of "FDA." Upon certification, the interface will assign associated semantic data with the particular object. In this case, the semantic data includes information from an encyclopedia entry. Thus, the logo icon for the encyclopedia is used to signify the classification of the associated semantic data which accompanies the object.

Figure 10:
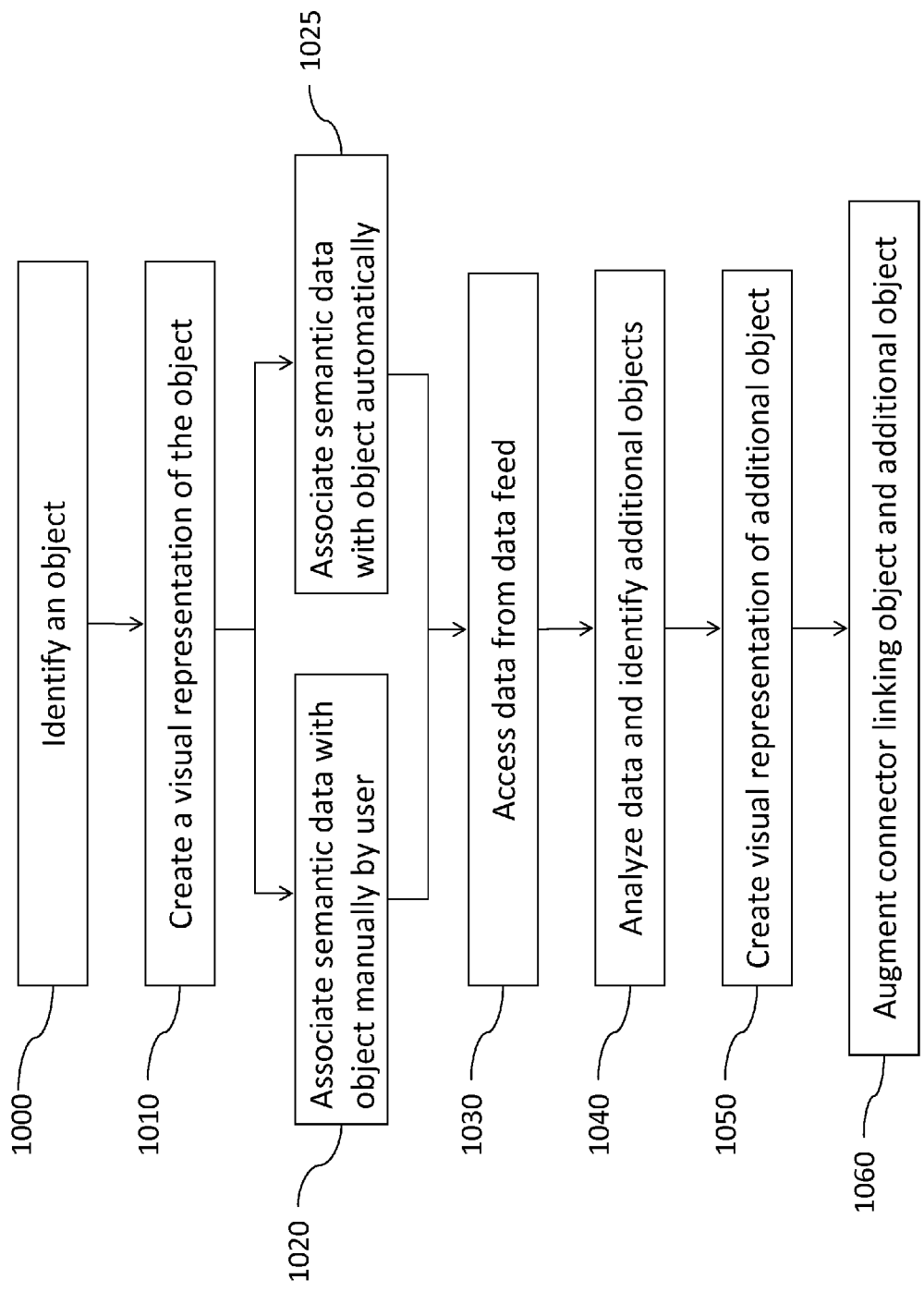
FIG. 10 shows a flow chart of a method of carrying out embodiments of the disclosed technology.

FIG. 10 depicts a flow chart of a method of carrying out embodiments of the disclosed technology. The method begins with the identification of an object in step 1000. As previously stated above, an "object," as used in this disclosure, refers to a concept, idea, goal, person, location, or file. In step 1010, a visual representation of the object is generated and exhibited within an interface. The next step involves associating semantic data with the object. Either in step 1020, a user manually associating semantic data with the object (the user may confirm data associated with the visual representation of an object and/or assign which data sources to use as data feeds for the given object) or, alternatively, step 1025 is carried out whereby an interface is automatically configured to associate semantic data, using one or more data sources, to such a data source via a network note. Semantic data can be textual content representative of an idea, a goal, an association, a source of information, or textual description of an object. Semantic data may be an image, audio, video, document, or any other file type which may be stored on a local or remote drive. Semantic data in the form of a source of information may be a rich text field or concept, such any other web-based information resource or web-link thereof.

Next, the method proceeds with step 1030 in which data about the object is accessed from one or more data feeds. That is, for example, a FBXML or RSS data feed is read and relevant data is parsed or filtered and added to a mind map. In step 1040, the accessed data are then analyzed and additional related objects are identified, such as additional links, friends, or data which is relevant to already existing or newly added visualizations of objects. In step 1050, a visual representation is created for each of one or more of the additional objects. That is, for example, when adding "Germany" to a list of countries, the Rhine river is then added to a list of rivers to visit with channels for boat passage on another part of the mind map where such activities are being planned. Finally, in step 1060, a connector is augmented (added) between the original or existing object or objects and each of one or more of the additional semantically related objects.

Figure 11:
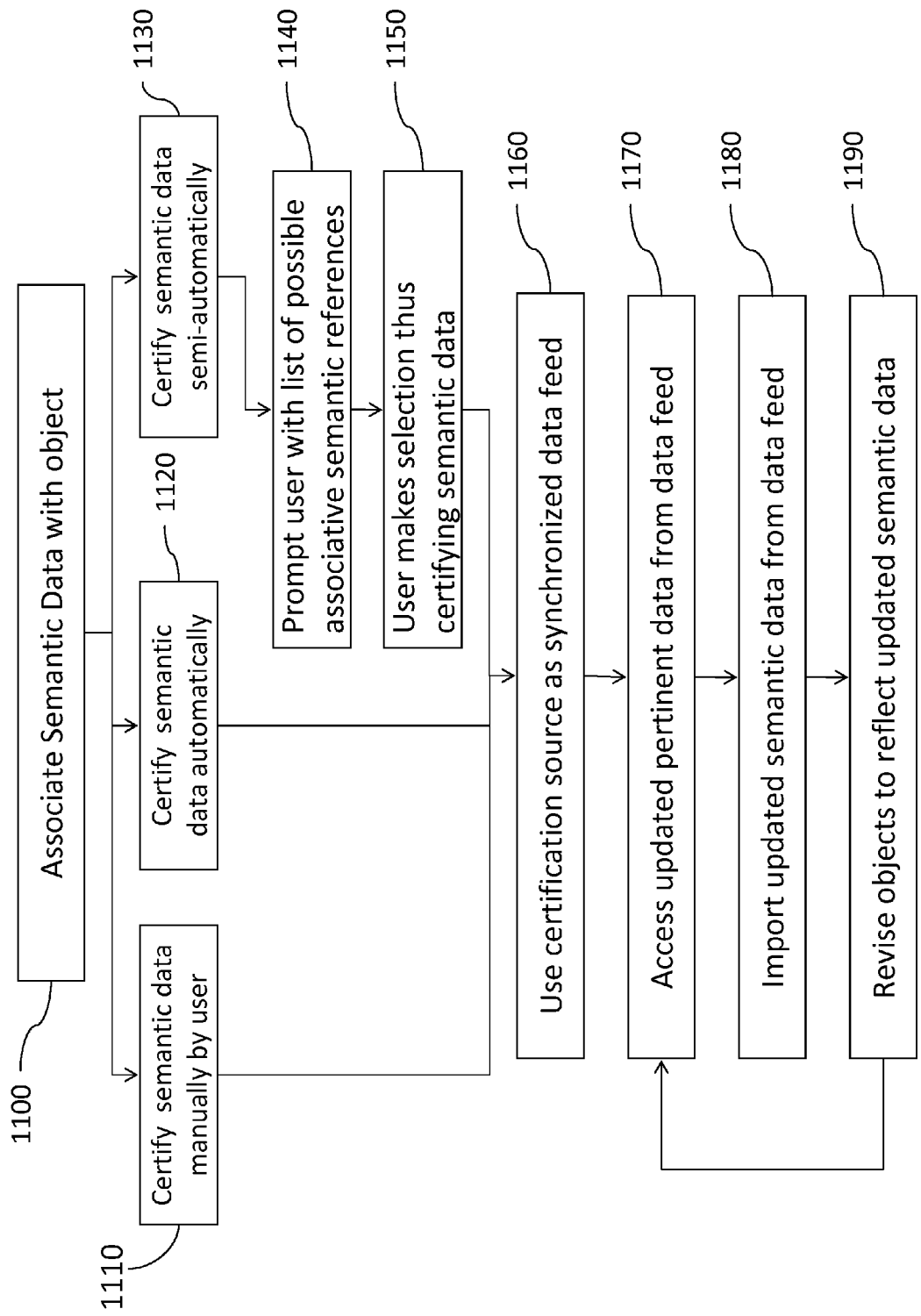
FIG. 11 shows a flow chart of a method of carrying out embodiments of the disclosed technology relative to certification and updating of semantic data.

FIG. 11 depicts a flow chart of a method of carrying out embodiments of the disclosed technology relative to certification and updating of semantic data. In step 1100, this embodiment of the disclosed technology begins with semantic data being associated with the object. As discussed in detail in this specification, the semantic data may be assigned manually or automatically. Similarly, the certification of semantic data may be automatic, manual, or semi-automatic. In step 1110, the user certifies the semantic data manually. In this instance, the user confirms the accuracy of the semantic data with the click of a mouse button or stroke of the keyboard. Alternatively, in step 1120, the semantic data is certified automatically using one or more data feeds. The data feeds use data sources in order to certify data. Such certification data sources may be, for example, an online social networking platform (a data feed updatable by any friend of the operator of the feed or member of a group pertaining to the feed) to certify personal information, or an online application such as a map to certify geographical information. Step 1130 is yet another alternative mode of certification of semantic data which involves partial or semi-automatic certification. In this mode, a user is prompted with a list of possible associative semantic references in step 1140. The list may be, for example, a search result generated by a data source such as a search for patents on the U.S. Patent Office database, using a keyword or classification search. In step 1150, the user selects the proper reference from the list, thereby certifying the semantic data associated with the given object. Step 1160 begins the process of synchronizing semantic data in order to keep it up-to-date. In this embodiment, the certification source is synchronized to the object and is used as a data feed. Step 1170 proceeds as long as there is access to the sources of the data feed. If a data source is a webpage, this would mean a connection to the Internet or local copy of the data is required. If a data source is a local file, access to a local hard drive or networked drive masquerading as a local drive must be enabled. In step 1180, data is imported to the interface from a data feed. Finally in step 1190, the objects and any associated semantic data are revised in order to reflect any changed or updated information.

FIG. 12 shows an alternative embodiment of a method of the disclosed technology in which a related object is proposed to a user from another user's mind map. In this embodiment, a user is prompted with a visual representation of a related object 1210 which is imported from another user's mind map. The system proposes the related object based on semantic data associated with an object 1200 originally found in the user's mind map. The connector 1220 is shown as being dotted and having a question mark in order to indicated to the user that the addition of the related object to the user's mind map is contingent upon the user accepting the proposed related object. Referring still to FIG. 12, the visual representation of the related object 1210 further comprises, in embodiments of the disclosed technology, a visual or other indicator 1215 which indicates its source. The source may be the author of another mind map or connection on a social network. In the example shown in FIG. 12, the source is another user's mind map, thus depicted by an icon with the user's name and picture.

Figure 13:
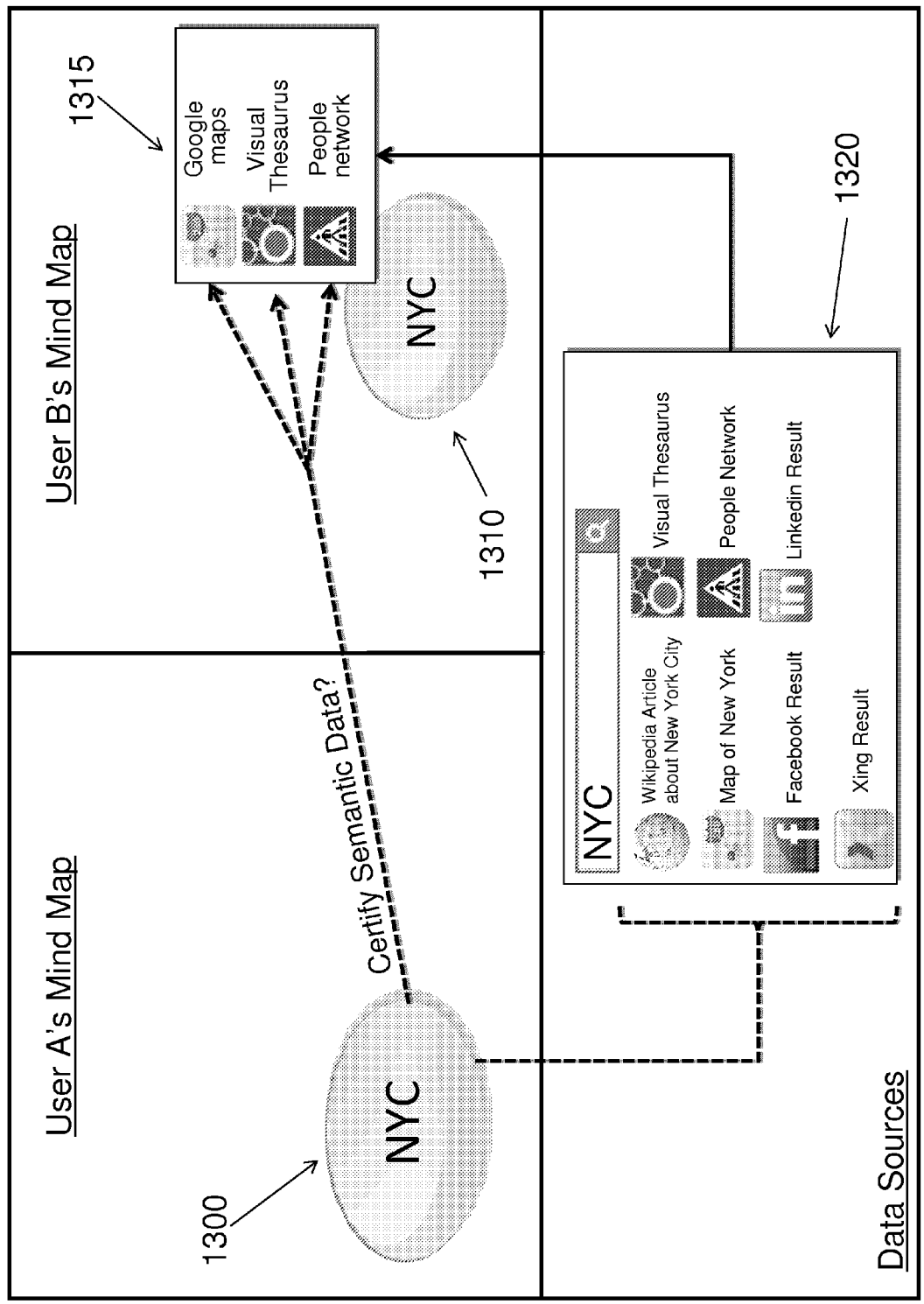
FIG. 13 shows an alternative embodiment of a method of the disclosed technology in which data is certified using data associated with another user's mind map.

FIG. 13 shows an alternative embodiment of a method of the disclosed technology in which data is certified using data associated with another user's mind map. This embodiment builds on the embodiment shown with respect to FIG. 12. In this embodiment, after generating a visual representation of an object, associated semantic data may be certified using data from a common object found in another user's mind map. In the example provided in FIG. 13, user A generates a visual representation of an object "NYC" 1300. The system automatically recognizes that a similar object 1310 is contained in another user's mind map (User B). This object 1310, in User's B's mind map, already has certified semantic data 1315 associated with it. Being that User A and User B may be acquaintances; chances are that they may have the same interests with regard to the acronym "NYC". Thus, User A may elect to certify and associate semantic data in his or her mind map using the semantic data found in User's B's mind map. Also shown in FIG. 13 is a window 1320 exhibiting a plurality of data sources which may be associated with and used to certify the object "NYC". As indicated by the solid arrow, User B has already chosen which semantic data sources to associate with "NYC" amongst those contained in the window. Likewise, User A may choose to associate and certify semantic data from one or more of the data sources listed in the window 1320. Alternatively, User A may choose to use the same data sources as User B to associate and certify the object representing "NYC".

Figure 14:
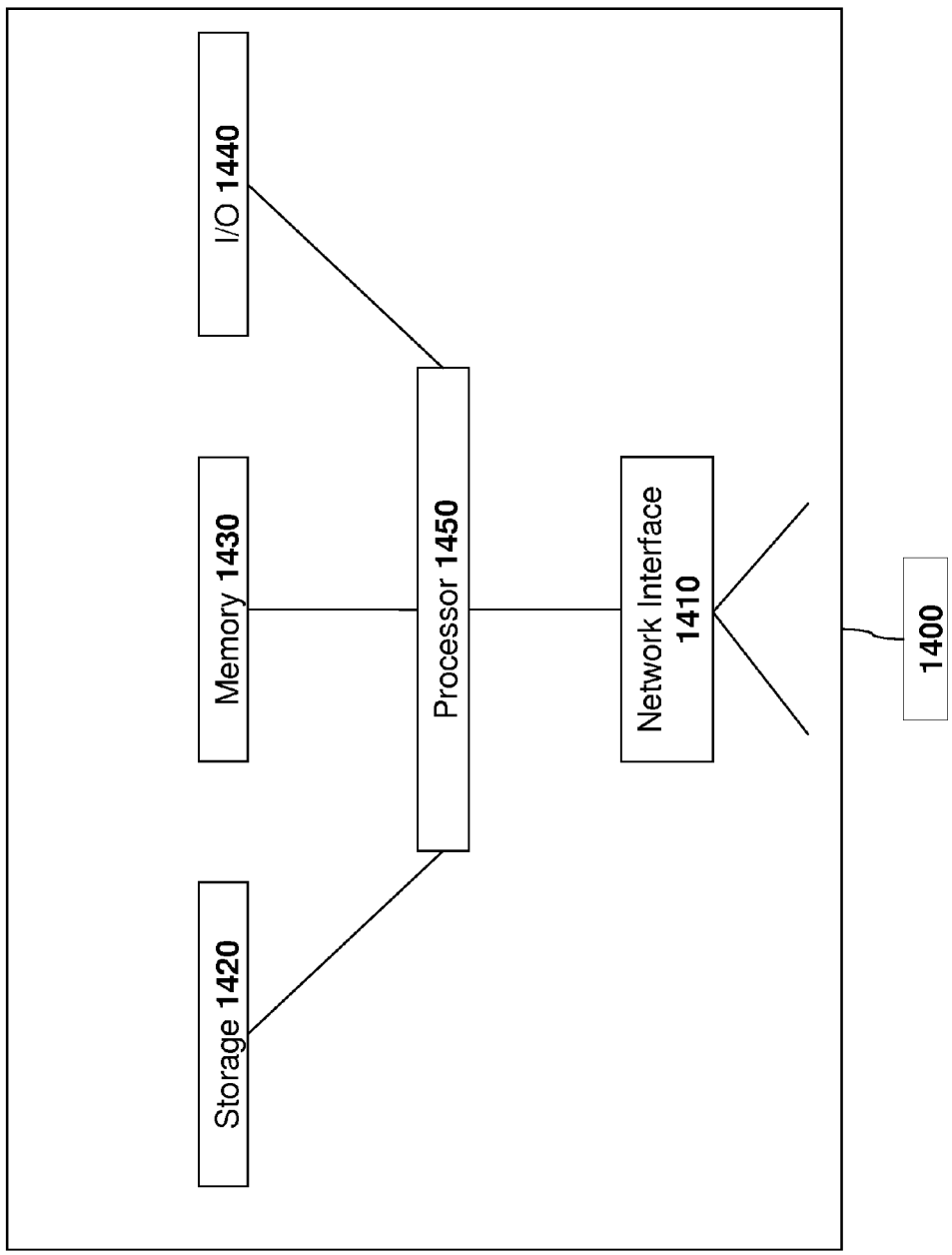
FIG. 14 shows a high-level block diagram of a device that may be used to carry out a method of the disclosed technology A better understanding of the disclosed technology will be obtained from the following detailed description of the preferred embodiments taken in conjunction with the drawings and the attached claims.

FIG. 14 shows a high-level block diagram of a device that may be used to carry out the disclosed technology. Device 1400 comprises a processor 1450 that controls the overall operation of the computer by executing the device's program instructions which define such operation. The device's program instructions may be stored in a storage device 1420 (e.g., magnetic disk, database) and loaded into memory 1430 when execution of the console's program instructions is desired. Thus, the device's operation will be defined by the device's program instructions stored in memory 1430 and/or storage 1420, and the console will be controlled by processor 1450 executing the console's program instructions. A device 1400 also includes one or a plurality of input network interfaces for communicating with other devices via a network (e.g., the internet). The device 1400 further includes an electrical input interface for receiving electrical current. A device 1400 also includes one or more output network interfaces for communicating with other devices, such as routers, switches, hubs, and other network nodes. Device also includes input/output representing devices which allow for user interaction with a computer (e.g., display, keyboard, mouse, speakers, buttons, etc.). One skilled in the art will recognize that an implementation of an actual device will contain other components as well, and that FIG. 12 is a high level representation of some of the components of such a device for illustrative purposes. It should also be understood by one skilled in the art that the method and devices depicted in FIGS. 1 through 13 may be implemented on a device such as is shown in FIG. 14.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the disclosed technology.

I claim:

1. A method of augmenting a mind map based on at least one data feed accessed via a network node, where the method comprises:
   a) generating and exhibiting a visual representation of an object;
   b) associating semantic data with said object, wherein said semantic data describes a characteristic or feature of said object;
   c) receiving from a user identification of at least one said data feed to be accessed via set network node;
   d) providing a control that is operable to access data from said at least one data feed including said data feed identified by said user via said network node;
   e) analyzing output of said at least one data feed and identifying additional objects which are semantically related to said object;
   f) augmenting said visual representation of said object with a connector from said object to a visual representation of said additional object; and
   g) arranging said visual representation of said objects in a hierarchical fashion based on interdependency of a said object with at least one said additional object, wherein said visualization of said mind map centralizes a said object possessing a greater number of said connectors to said additional objects than other said objects.

2. The method of claim 1, further comprising a step of disambiguating said semantic data corresponding to said object by determining third party data to be related to said object.

3. The method of claim 2, wherein said step of disambiguating data comprises using an object found in another mind map as a data source for disambiguating said semantic data.

4. The method of claim 2, wherein said semantic information is disambiguated automatically using a data source.

5. The method of claim 1, wherein said connector comprises information pertaining to a type of an association of which it is representative.

6. The method of claim 5, wherein said type of association between said object and said additional object is automatically assigned using said semantic data, wherein said semantic data describes a characteristic or feature of said object.

7. The method of claim 5, wherein said type of association between said object and said additional object is manually assigned by a user.

8. The method of claim 1, further comprising a step of adding semantic information corresponding to said object by classifying said object as a member of a class, wherein said class has associated semantic information.

9. The method of claim 8, wherein said class comprises data representative of time.

10. The method of claim 8, wherein said class comprises data associated with individual social networking profiles of people, and data from said social networking platform is imported.

11. The method of claim 8, wherein said class comprises data representative of geographic locations.

12. The method of claim 4, wherein said data source is selected from the group consisting of:
   a) a hypertext markup language (HTML) document;
   b) a global navigation satellite system receiver; and
   c) a local non-volatile data storage medium.

13. The method of claim 1, wherein said data feed identified by said user comprises data associated with at least one person imported from a third party social networking platform, wherein said at least one person is selected from a group consisting of said user, contacts of said user, and all users of said social networking platform.

14. The method of claim 13, further comprising:
   updating said social networking platform data feed identified by said user by importing new data as it becomes available from said third party social networking platform; and
   automatically mapping said new data to said mind map by creating a new object with a corresponding new visual representation thereof.

15. The method of claim 14, further comprising:
   associating semantic data with said new object; and
   augmenting said new visual representation of said new object with a new connector from said new object to a pre-existing visual representation of a pre-existing object.

16. The method of claim 14, further comprising, by way of interacting with said visual representation of a said object, a response to data received from said social networking platform data feed selected by said user and instructing said social networking platform to augment said data feed selected by said user with data provided during said interacting.

* * * * *